United States Patent [19]

Hethuin

[11] Patent Number: 5,712,639
[45] Date of Patent: Jan. 27, 1998

[54] METHOD FOR THE LOCALIZING OF A TRANSCEIVER OF DATA PACKETS

[75] Inventor: Serge Hethuin, Courbevoie, France

[73] Assignee: Thomson-CSF, Paris, France

[21] Appl. No.: 703,540

[22] Filed: Aug. 27, 1996

[30] Foreign Application Priority Data

Sep. 19, 1995 [FR] France ................. 95 10950

[51] Int. Cl.$^6$ ................................ G01S 13/74
[52] U.S. Cl. ........................................ 342/47
[58] Field of Search ................. 342/47, 42, 43, 342/44, 45, 46, 48, 49, 50, 51

[56] References Cited

U.S. PATENT DOCUMENTS

| | | |
|---|---|---|
| 4,072,946 | 2/1978 | Kneefel . |
| 4,464,662 | 8/1984 | Tomasi .................... 342/125 |
| 4,636,958 | 1/1987 | Hethuin et al. ........... 342/399 |
| 4,728,957 | 3/1988 | Hethuin .................... 342/401 |
| 4,766,436 | 8/1988 | Crepin et al. ............ 342/122 |
| 4,947,354 | 8/1990 | Hethuin .................... 342/122 |
| 5,032,840 | 7/1991 | Hethuin .................... 342/35 |
| 5,072,223 | 12/1991 | Hethuin et al. ........... 342/122 |
| 5,458,122 | 10/1995 | Hethuin .................... 128/696 |

FOREIGN PATENT DOCUMENTS

| | | |
|---|---|---|
| 0 324 564 | 7/1989 | European Pat. Off. . |
| 0 573 321 | 12/1993 | European Pat. Off. . |
| 2 243 739 | 11/1991 | United Kingdom . |

*Primary Examiner*—Daniel T. Pihulic
*Attorney, Agent, or Firm*—Oblon, Spivak, McClelland, Maier & Neustadt, P.C.

[57] ABSTRACT

The disclosure pertains to the localization of a station by another station in a network for the transmission of data in packets, each packet being formed by a header followed by an information field at a carrier frequency that varies according to a linear ramp. The method consists, in a first station, in sending out an interrogation packet with a designation of a second station, in the second station, upon the reception of this interrogation packet, in sending a signal in continuity with the field of the packet received and according to the same ramp and, in the first station, in measuring the delay of this signal, when it is received, with respect to a signal produced in the first station after the field of the packet sent out and in deducing the distance between the two stations from the delay. Application to the measurement of distances.

5 Claims, 2 Drawing Sheets

METHOD FOR THE LOCALIZING OF A TRANSCEIVER OF DATA PACKETS

BACKGROUND OF THE INVENTION

The present invention relates to the localization of a transceiver of data packets and more particularly to a measurement of distance between two transceivers of data packets. The context of the invention is that of the networks where data is transmitted in packets each of which comprises a header at a first carrier frequency followed by a field of information elements at a second carrier frequency that varies along a linear ramp.

The knowledge, possessed by all the transceiver stations of the network, of the distance between themselves and the other stations of the network makes it possible to optimize the functioning of the network, especially by adapting the information bit rates to the distance between the two stations of a link to be set up. This knowledge of the distances may of course be used also for purposes other than the operation of the network, for example for the precise localizing of a station B by a station A if the station A has precise knowledge of its own position and knows the route being travelled by the station B.

To find out this distance, it is possible to add a radar installation to each transceiver station. However, this solution is far too costly to be used unless the radar installation is designed solely for a measurement of distance between a station of the network and the other stations of the network. Furthermore, for comparably priced antennas, the transmission power necessary for a radar installation to obtain a return signal of a given level from a given distance is far greater than the transmission power necessary for a transmitter station in order that a receiver station, located at this same given distance, may receive a signal having this same given power.

The measurement of distance can also be done in a network if all the stations are capable at any time of giving the co-ordinates of their position but, to have a precise measurement of distance, it is necessary that each station should be capable of giving its co-ordinates with precision. This necessitates the addition of position-finding equipment to each station, and the greater the precision desired, the costlier is this position-finding equipment.

SUMMARY OF THE INVENTION

The aim of the invention is to prevent or at least to reduce these drawbacks.

This is obtained by a selective and co-operative measurement of distance where a station A that wishes to measure the distance between itself and a station B sends an interrogation message to the station B. From the time that elapses between the sending of the message and the reception of the corresponding response from the station B, the station A deduces the distance that is to be found.

According to the present invention, there is provided a method for the localizing of a transceiver, this method being designed to measure the distances between the transceiver stations of a network in which the data elements are transmitted in packets, each packet comprising a header at a first carrier frequency followed by an information field at a second carrier frequency that varies according to a linear ramp, this method consisting successively, at a first of the stations, in sending an interrogation packet comprising the designation of a second of the stations, in the second of the stations, when the interrogation packet is received, in sending a response signal at a third carrier frequency that varies according to the linear ramp, in continuity with the second carrier frequency of the interrogation packet received and, in the first of the stations, when the response signal is received, in measuring the beat frequency between the second carrier frequency and third carrier frequency to deduce therefrom a value of the distance between the first of the stations and second of the stations.

BRIEF DESCRIPTION OF THE DRAWINGS

The present invention shall be understood more clearly and other characteristics shall appear from the following description and from the figures pertaining thereto, of which.

In the different figures, the corresponding elements are designated by the same references.

MORE DETAILED DESCRIPTION

Figure 1:
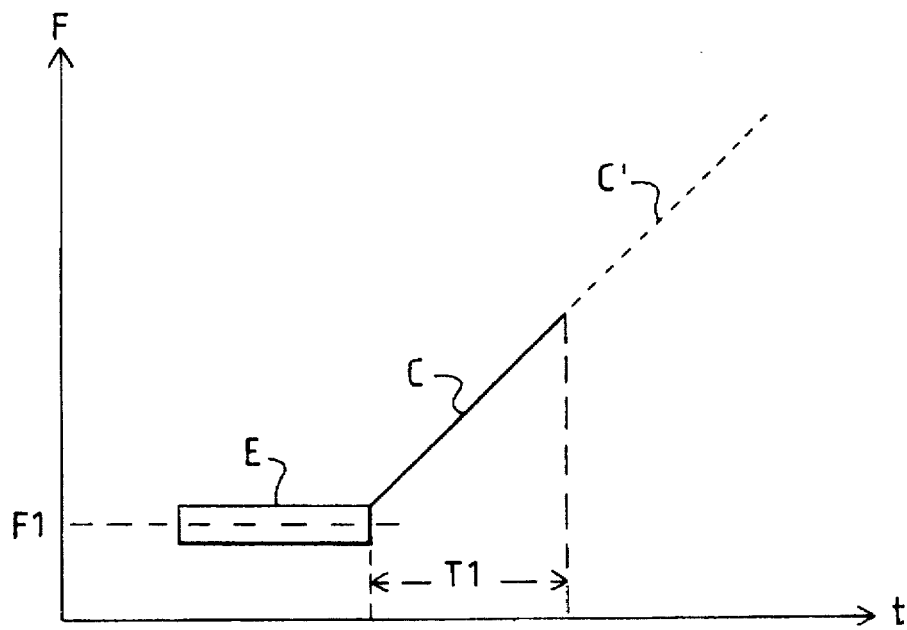
FIG. 1 shows a timing diagram pertaining to a packet of the type used in the invention.

FIG. 1 is a schematic frequency/time diagram showing how a packet is transmitted within the framework of the invention.

The packet has a header E followed by an information field C.

The header is transmitted at a fixed carrier frequency F1 and occupies a transmission channel. A rectangle in FIG. 1 symbolizes the boundaries in time and frequency between which the header considered is transmitted.

The information field C is transmitted at a carrier frequency Fv that varies linearly according to a ramp. This field lasts for a duration T1 which, in the example described, is fixed. When the field is transmitted, the station that has transmitted it continues to produce the frequency Fv, along the linear ramp. This is the signal C' shown in dashes in FIG. 1. The usefulness of this signal C', for internal use in the station considered, will appear hereinafter.

Figure 2:
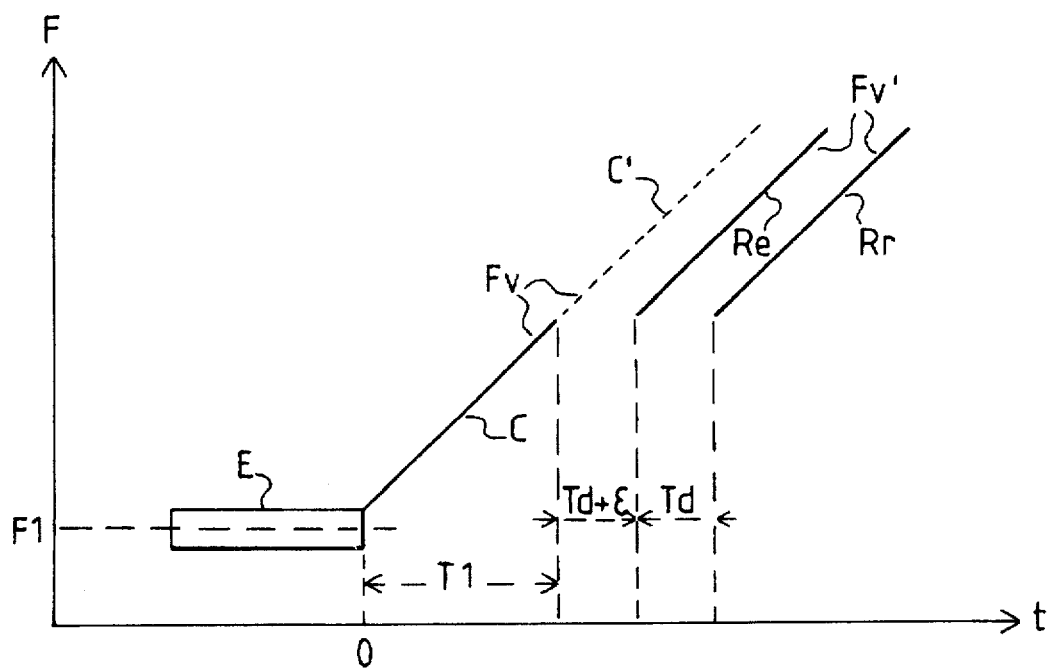
FIG. 2 shows a timing diagram pertaining to a measurement of distance according to the invention.

FIG. 2 is a schematic frequency/time diagram showing the exchange of signals, during a measurement of distance according to the invention, between two transceiver stations A and B of one and the same network.

In the example described, it is the station A that seeks to know the distance between itself and the station B. For this purpose, the station A prepares a packet E, C which shall be called an interrogation packet, and extends this packet by a signal C' for internal use, as indicated in FIG. 1. The address of the intended recipient station B and the information according to which the packet E, C is designed to enable a measurement may be contained either in the header or in the information field C. In the example described, the address is contained in the header and a synchronization mode information element that should be described further below is positioned at the beginning of the field.

The packet transmitted by the station A is received by the other stations of the network located in the radiation pattern of the station A. This signal is analyzed for the synchronization search. Conventionally, in packet transmission, when a correlation peak is detected, the analysis of the following peaks, during a given time interval, is done so as to determine the optimum instant of synchronization. This optimum instant of synchronization is obtained by processing operations that shall be described further below. Each of the synchronized stations then decodes the address contained in the header and only the station B which recognizes its own address in the header of the packet processes the information field C which follows the header E.

Apart from the information according to which the packet is designed to enable a measurement, the field C, with a duration T1, may comprise other information elements intended for the station B.

In FIG. 2, the starting point of the times, t=0, is placed at the beginning of the header E.

At the point in time T1, the station A stops its ramp and this end of ramp is received at T1+Td by the station B. Td corresponds to the time of propagation over the distance d between A and B. The synchronization of the station B with the signal received from the station A is achieved with a loss of precision $\epsilon$, where $\epsilon$ is a positive or negative duration. At the point in time T1+Td+$\epsilon$, the station B sends out a signal Re at a carrier frequency Fv'. This signal constitutes, apart from the synchronization error $\epsilon$, the continuation along the same linear ramp of the signal at the carrier frequency contained in the information field received from the station A. The signal Re, in the example described, is not modulated. At a variant, it may contain information elements intended for the station A, for example a code agreed upon between the stations A and B so that the station A has the certainty that the signal Re has been truly transmitted by the station B.

At the point in time (T1+Td+$\epsilon$)+TD=T1+2Td+$\epsilon$, the station A starts receiving the signal Re sent by the station B. In FIG. 2, the signal Re, when it is received by the station A, is represented by a ramp Rr.

In the station A, the station Rr is mixed with the signal C' generated, as described with reference to FIG. 1, by the station A.

The signal Rr is therefore received with a delay 2Td+$\epsilon$ with respect to the signal C', namely with respect to the extension of the carrier signal of the information field C'.

The mixing of the signals C' and Rr in the station A gives a beat frequency:

$$f=p(2Td+\epsilon)$$

where p is the slope, expressed in units of frequency per units of time, of the signals C' and Rr.

The measurement of the beat frequency f makes it possible to deduce the value of the distance d between the two stations with a relative error equal to $\epsilon/2Td$.

The distance measuring method that has just been described can be implemented without any structural modification in a transceiver station for transmission in packets, each constituted by a header at a fixed carrier frequency followed by an information field, the carrier frequency of which varies according to a linear slope. However, FIG. 3 indicates those parts of a station A that are used to interrogate and process the response signal and FIG. 4 indicates those parts of a station B that are used to receive the interrogation and respond thereto. These partial drawings correspond to the exemplary embodiment in which the address of the intended recipient is indicated in the header of the interrogation packet along with the information on measurement mode signifying the fact that the packet is an interrogation packet. The information field is always, in the example described, formed by a pure frequency. It is also possible to insert the information on measurement mode into the beginning of the field. This enables a reduction of the length of the header and therefore the diminishing of the risks of collision between the packets.

Figure 3:
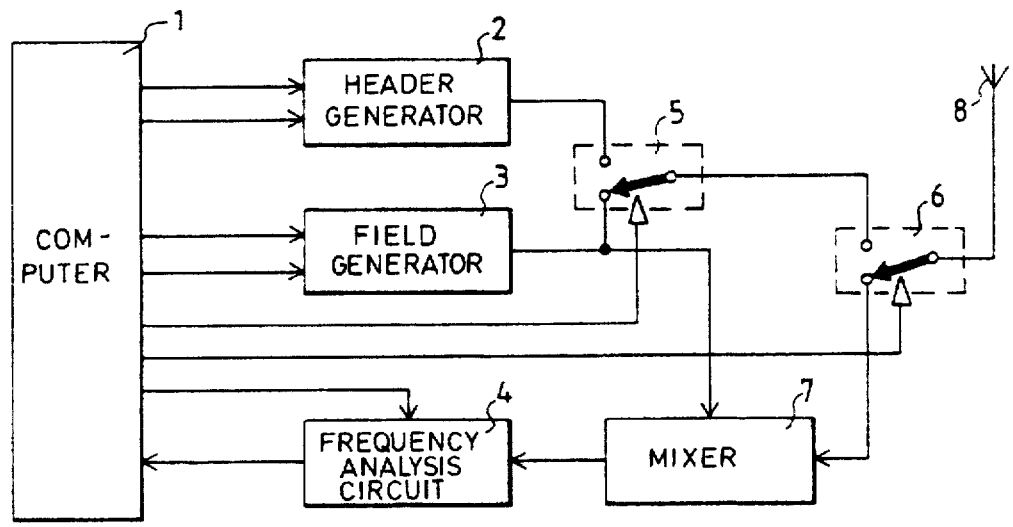
FIG. 3 shows a drawing of a transceiver station, this drawing being limited to the circuits used to send out an interrogation signal and process the corresponding response signal.
Figure 4:
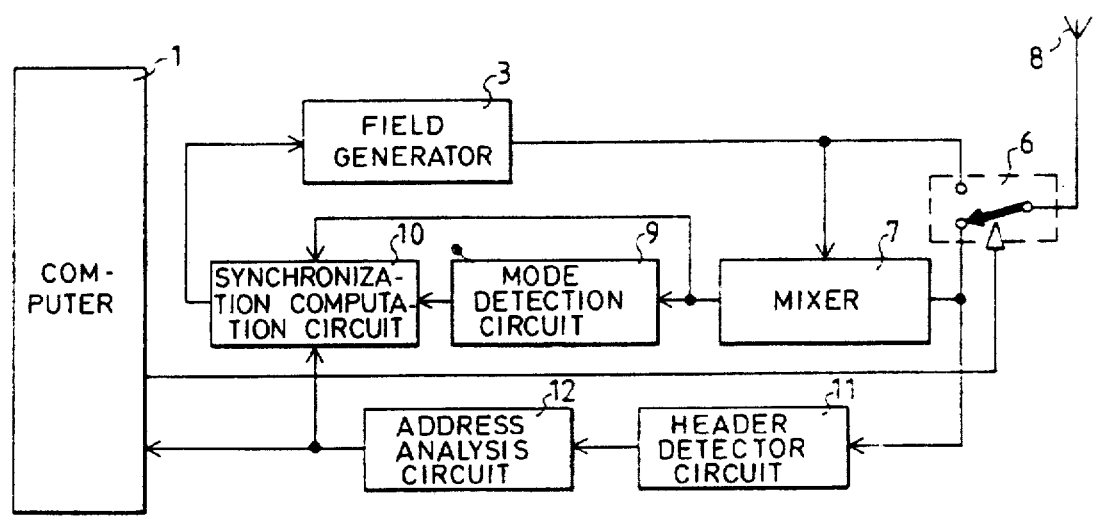
FIG. 4 shows a drawing of a transceiver station, this drawing being limited to the circuits used to receive an interrogation signal and send out a response signal in return.

Since the stations A and B are identical in the example described, certain circuits are designated by the same references in the partial drawings of FIGS. 3 and 4. These are the circuits that correspond to each other in these two stations.

The drawing of FIG. 3 shows a computer 1 that controls a header generator 2, an information field generator 3, a frequency analysis circuit 4 and two switches 5, 6, and receives the output signals from the circuit 4.

The header generator has its output connected to the first terminal of the switch 5, the midpoint of which is connected to the first terminal of the switch 6. The midpoint of the switch 6 is connected to a transceiver antenna 8. A mixer 7 has a first input connected to the second terminal of the switch 6 and a second input connected both to the second terminal of the switch 5 and the output of the field generator 3. The output of the mixer 7 is connected, through the frequency analysis circuit 4, to the computer 1.

For the transmission of the packet E, C according to FIGS. 1 and 2, the computer gives the header generator 2 the information on measurement mode, the address of the intended recipient station and a header starting signal. The computer gives the field generator 3 an information element on synchronization mode to be inserted into the information field and a field starting signal. The role of the information on synchronization mode will be specified after the description of FIG. 4. The computer 1 also activates the passage of the switch 5 into the high position for the time needed for the transmission of the header E, the passage of the switch 5 into the low position for the time needed for the transmission of the field C, the passage of the switch 6 into the high position for the time needed for the transmission of the packet E, C and the passage of the switch 6 into the low position as soon as the transmission of the packet E, C is ended. This low position of the switch 6 which, besides, is the position shown in FIG. 3, corresponds to the use of the transceiver station in receiver mode.

When the signal Rr according to FIG. 2 is received by the station A, the mixer 7 according to FIG. 3 mixes this signal Rr with the signal C' produced in the station A for internal use. As described with reference to FIG. 2, these signals Rr and C', through mixing, give a beat frequency f. This beat frequency is analyzed in the frequency analysis circuit 4 which is activated in synchronization mode by the computer 1 and this computer 1 receives the value of the frequency f from which it deduces the value of the distance d between the stations A and B.

The drawing of FIG. 4 represents the circuits of the station B which are used to receive the interrogation packet E, C from the station A and send the response signal Re to this packet. The diagram shows the computer 1 that activates the switch 6.

The switch 6 has its first terminal connected to the output of the field generator 3. In fact, this link takes place through the switch 5 according to FIG. 3 but since this switch is permanently in the high position when the station B responds to an interrogation, it has been replaced by a short circuit.

The second terminal of the switch 6 is connected, through a header detector circuit 11 followed by an address analysis circuit 12, to a first input of a synchronization computation circuit 10 and to the computer 1. The second terminal of the switch 6 is also connected to the first input of the mixer 7 which receives the output signal from the ramp generator 3 at its second input. This mixer 7 has its output directly connected to a second input of the synchronization computation circuit 10 and, through a synchronization mode detection circuit 9, to a third input of the circuit 10. The output of the circuit 10 is connected to a synchronization input of the ramp generator 3.

The midpoint of the switch 6 is connected to the antenna 8.

When the station B receives a packet, whatever it may be, its circuit 11 detects the header of the packet and the circuit 12 analyzes this header in order to give the contents thereof to the computer 1 and to the field generator if the header contains the address of the station B.

The signals given by the circuit 12 enable an approximate synchronizing of the field generator 3 with the carrier frequency of the field of the packet received. This is possible because all the packets are built according to a constant format and because, in particular, the address, in the header, of the intended recipient is separated from the beginning of the field by a fixed duration as is the case for all the packets. The field generator can therefore start getting synchronized with the header of the packet received and its output signal is sent, so long as the switch 6 is in the low position, to the mixer 7 where it is mixed with the signal received by the antenna 8.

The output signal from the mixer enables the synchronization mode detection circuit 9 to demodulate the information elements contained in the information field and especially to restore the information on synchronization mode giving the type of processing needed to get the synchronization. With the signals that it receives from the circuits 9 and 12, the circuit 10 first of all prepares a synchronization with the header that enables the tuning of the field generator 3 to be initialized. With the signals that it receives from the circuits 7 and 9, the circuit 11 performs a fine synchronization computation making it possible to reduce the value ε referred to in the description of FIG. 2 and hence to correct the tuning of the field generator 3.

The computer activates the switch-over of the switch 6 from the low position into the high position if it has received the address of the station B of which it is a part through the circuit 12. This switch-over command is sent by the computer with a delay corresponding to the interval of time between the address in the header E and the end of the field C. Starting from this switch-over, the station B sends out the signal Re that has been described with reference to FIG. 2.

The following observation pertains to the synchronization modes referred to further above. On the basis of the header, the station B will find a number of correlation peaks corresponding to the different routes or multiple paths involved in the communication between A and B. One of the modes of synchronization consists in taking the peak with the highest energy. In this case, the station A informs the station B, by means of the information elements transmitted in the first part of the field, that this mode of synchronization is the one to be taken into account. A second mode of synchronization consists in taking the barycentric mean of the echoes received by the station B. In this case too, the station A informs the station B that this processing is the one to be applied. There are other modes of synchronization and, in general, it is the station A, the one that performs the measurement of distance, that informs the station B of the synchronization mode to be adopted. The station A accordingly uses a processing algorithm on the beat signal, identical to the one used in the station B.

Again with regard to the synchronization, the station B may, in certain applications, be used solely as a header and the circuits 7, 9 and 10 of FIG. 4 will not be implemented. By contrast, in the example described, the station B uses the field C sent out by A to refine the synchronization obtained on the header. To this end, the field C is of the pure carrier type, namely without modulation, except for the start which may contain a certain number of information elements, including the address of the intended recipient. To ascertain the additional correction to be applied to the tuning of the synchronization, it is necessary to compute the residual frequency offset given by the beat between the frequency ramp of the received field and the internal ramp that is activated starting with the synchronization beep obtained at the header. The frequency offset is then converted into a positive or negative time correction and the tuning of synchronization is then increased or diminished accordingly. The synchronization correction found is used to correct the field generator by the value of its instantaneous frequency. There thus appears a small upthrust if the frequency ramp of the generator is deemed to be delayed or, if the ramp is deemed to be in advance, the frequency is held at a steady level for the time taken to await the nominal frequency.

It must furthermore be noted that the precision of distance measurement is valid only if the tuning of synchronization is efficient enough and if the drift between the transmitter and receiver is acceptable or can be estimated and corrected. The term "drift" herein designates the difference between the starting point of the frequency ramp of the signal received and the starting point of the frequency ramp of the receiver. Inasmuch as the generation of these frequency ramps is done digitally, thus ensuring strict conformity between the slope of the frequency ramp of the transmitter and the slope of the frequency ramp of the receiver, it is only the total permanent offsets in frequency that are to be considered. To eliminate the offset existing between the wave of the received signal and that of the receiver, it is possible, at the end of a header, to transmit a pure frequency which is then received by the station B and which, by difference with the local oscillator of the station B, enables the determining by B of the frequency offset. This frequency offset firstly may be used to correct the tuning of the field generator and secondly may be sent to the station A to be taken into account in the processing performed by A.

With regard to the headers, it must be observed that when they are short, the station A may have to give the address of the concerned station B not in the header E but in the very first part of the information field C. In this case, all the stations that have been able to get synchronized demodulate the first part of the field and only the station B whose address is contained in this field will continue the processing of the end of the field.

The duration T1 of the field C according to FIGS. 1 and 2 can be best defined as a function of the application. In particular, T1 may be fixed at 0 to leave the maximum amount of time for the measurement of distance. In this specific case, the address of the moving body B is of course obligatorily transmitted in the header.

What is claimed is:

1. A method for the localizing of a transceiver, this method being designed to measure the distances between the transceiver stations of a network in which the data elements are transmitted in packets, each packet comprising a header at a first carrier frequency followed by an information field at a second carrier frequency that varies according to a linear ramp, this method consisting successively, at a first of the stations, in sending an interrogation packet comprising the designation of a second of the stations, in the second of the stations, when the interrogation packet is received, in sending a response signal at a third carrier frequency that varies according to the linear ramp, in continuity with the second carrier frequency of the interrogation packet received and, in the first of the stations, when the response signal is received, in measuring the beat frequency between the second carrier frequency and third carrier frequency to deduce therefrom a value of the distance between the first of the stations and second of the stations.

2. A method according to claim 1 consisting of the synchronizing, in the second of the stations, of the response signal with only the header of the interrogation packet.

3. A method according to claim 1 consisting of the synchronizing, in the second of the stations, of the response signal with the header and then with the field of the interrogation packet.

4. A method according to claim 1, wherein the designation of the second of the stations is an information element recorded in the header of the interrogation packet.

5. A method according to claim 1, wherein the designation of the second of the stations is an information element recorded at the beginning of the field of the interrogation packet.

\* \* \* \* \*